March 18, 1958  E. J. KASPER  2,827,311
SWIVEL COUPLING WITH MEANS TO AID DISASSEMBLY
Filed May 4, 1954
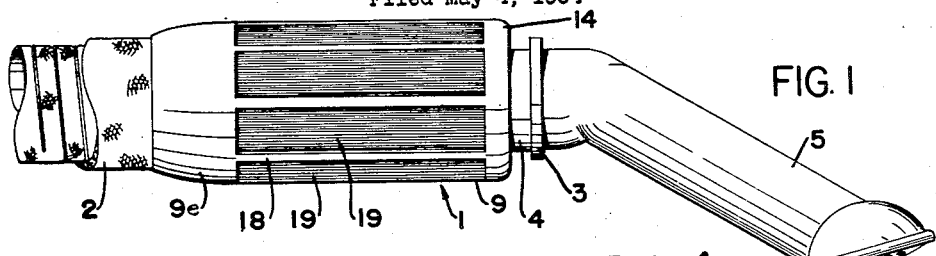
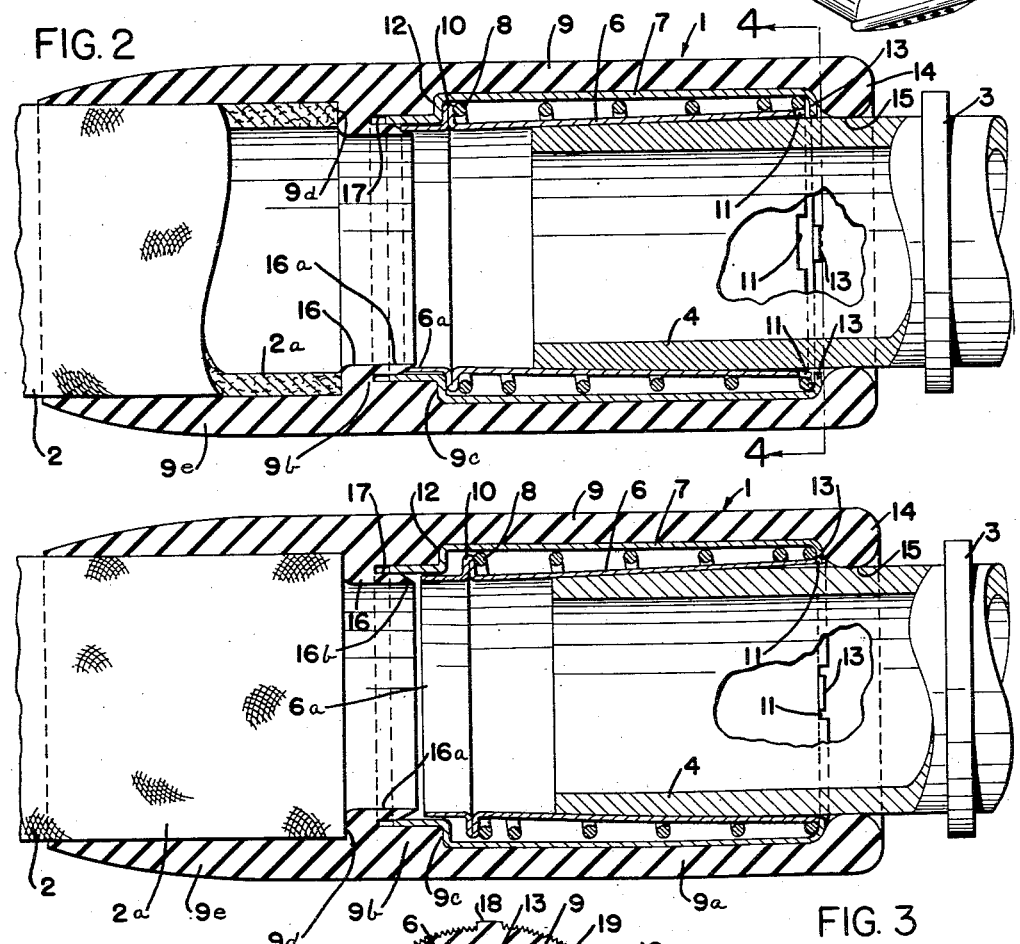
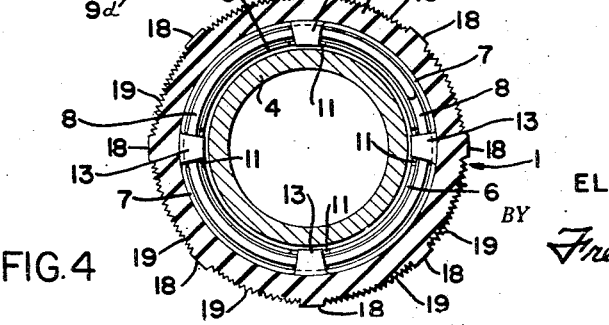
INVENTOR.
ELMER J. KASPER
BY
Frease & Bishop
ATTORNEYS

United States Patent Office 2,827,311
Patented Mar. 18, 1958

2,827,311

SWIVEL COUPLING WITH MEANS TO AID DISASSEMBLY

Elmer J. Kasper, Cleveland, Ohio, assignor to Royal Appliance Mfg. Co., Cleveland, Ohio, a corporation of Ohio Application May 4, 1954, Serial No. 427,545

7 Claims. (Cl. 285—7)

This invention relates to tubular couplings and more particularly it pertains to separable, airtight, rotatable connectors between attachment hose, tubes, nozzles, and the like, of suction cleaners.

Attachments for suction cleaners should be readily separable from and airtightly connected to the cleaning hose extending from the cleaner. A satisfactory seal against separation and air leakage is indispensable. However, the tubular members forming the connection must be easy for an unskilled person to separate and assemble.

At the same time it is desirable that the attachment be rotatably mounted in order to facilitate movement of the attachment over surfaces to be cleaned. That is, if the attachment is movable about the axis of the end of the hose, it is more easily maneuverable because fewer arm movements are required. As the attachment is moved over a curved surface, such as the back of an upholstered chair or couch, the suction end of the attachment should be free to turn with said surface without the necessity of the operator turning his or her wrist or forearm in addition to a minimum of other arm movements required merely to traverse the surface to be cleaned. That is to say, attachments having non-swivel or non-rotatable connections with the end of hoses or extensions require the operator to hold his or her wrist stiff and turn the tool with his or her forearm from the elbow.

Heretofore, rotatable or swivel couplings for suction cleaner extension hose attachments have been expensive, have been subject to air leakage, and have been difficult to separate. Moreover, previous swivel or rotatable couplings which have been easily separable and airtight have incorporated retaining springs and pins which have invariably resulted in an uncomfortable looseness between the hose and the attachment.

Moreover, prior swivel extensions that have been provided between the end of the extension hose and the attachment have been undesirable because of requiring unwieldy movements on the part of the operator.

Another difficulty with prior swivel or rotatable connectors have been that the coupling had no provision for preventing free or uncontrolled turning of the swivel during actual use.

From the cost standpoint, telescopic tubular connections are desirable for a detachable hose-attachment connection in suction cleaner construction, whether the telescopic tubular members have interfitting end portions that are either straight or tapered. Tapered tubular connections, however, are desirable as a cheap means for attaching the male end of one member into the female of the second, there being no need for retainer spring-pin mechanisms or equivalent mechanical means.

I have discovered that these difficulties may be overcome by providing a coupling on one end of an attachment hose having a pair of sleeves, one rotatable within the other, and both being entirely mounted within an overlying rubber sleeve connected to the hose. The inner rotatable sleeve is spring-biased in one direction with respect to the outer stationary sleeve. Keying means are provided between the sleeves for engagement to hold the rotatable sleeve stationary when it is desired to separate an attachment from the inner sleeve. Such mechanism is not only easily separable and airtight due to the overlying rubber sleeve, but is also devoid of looseness since the inner and outer sleeves are always spring-tensioned with respect to each other.

Moreover, the use of a rubber sleeve around the swivel coupling is desirable to serve as a hand grip formed on the end and as a part of the attachment hose. Also, such rubber sleeve may be assembled without cementing to a metal member. In prior constructions, cementing of rubber and metal sleeves together has failed from forces applied in assembling and disassembling the connection.

Accordingly, it is a primary object of this invention to provide a swiveling means for tapered couplings between suction cleaner extension tubes and attachments whereby assembly and disassembly of the tubes and attachments is facilitated.

It is another object of this invention to provide a swivel coupling for suction cleaner extension hoses which is airtight at all times.

Another object of this invention is to provide a swivel coupling for suction cleaner extension hoses and attachments which is disposed entirely within the end of the hose and which is covered by a rubber sleeve that serves as a bumper.

Another object of this invention is to provide an elastic sleeve on the end of an extension hose which is positively secured to a swivel coupling therein without the use of cement and the like.

Still another object of this invention is to provide a swivel coupling having locking means for disengaging tapered tubular portions of an attachment from a tapered rotatable sleeve.

Finally, it is an object of this invention to provide a swivel coupling for suction cleaner attachments which is inexpensive in construction and which satisfies the foregoing objects and desiderata.

These and other objects and advantages apparent to those skilled in the art from the following description and claims may be obtained, the stated results achieved, and the described difficulties overcome, by the discoveries, principles, apparatus, parts, combinations, subcombinations and elements which comprise the present invention, the nature of which is set forth in the following general statement, a preferred embodiment of which—illustrative of the best mode in which applicant has contemplated applying the principles—is set forth in the following description, and which are particularly and distinctly pointed out and set forth in the appended claims forming part hereof.

Generally, the swivel connector constituting the present invention may be stated as preferably including a pair of sleeves telescopically disposed with respect to each other, one of said sleeves being rotatable within and movable longitudinally with respect to the other sleeve, the sleeves being spring-biased in one direction with respect to each other so as to permit free rotation therebetween, the sleeves having locking or keying means to prevent rotation therebetween upon the exertion of a longitudinal force greater than the spring force holding the sleeves in the spring-biased position, and the sleeves being mounted within an outer elastic sleeve having an overlying end, the inner circumference of which end is less than that of the tubular portion of an attachment insertible within the coupling, whereby the assembly provides an airtight connection with such attachment, as well as an easily detachable and rotatable coupling within the end of an extension hose.

By way of example, a preferred embodiment of the swivel coupling is illustrated in the accompanying drawing in which similar numerals refer to similar parts throughout the various figures, wherein:

Fig. 1 is a fragmentary elevational view showing the improved swivel coupling on the end of an extension hose of a suction cleaner and an attachment extending from said coupling;

Fig. 2 is a fragmentary longitudinal section view of the swivel coupling showing the manner in which the attachment is mounted therein under normal operating conditions;

Fig. 3 is a longitudinal sectional view showing the manner in which locking means between the inner and outer sleeves is manipulated to withdraw an attachment; and Fig. 4 is a transverse sectional view taken on the line 4—4 of Fig. 2.

Referring to Figs. 1, 2 and 3, a rotatable or swivel coupling is generally indicated at 1 secured to the end of a usual extension hose or tube 2 at one end, and having a suction attachment or tool 3 extending from the other end. The tool 3 includes a tubular portion 4 tapered, as shown, on its outer surface, adapted to be inserted into the coupling 1. The tool 3 also includes a suction nozzle portion 5.

The coupling 1 comprises an inner sleeve 6, an outer sleeve 7, a helical spring 8 between said sleeves, and an elastic sleeve 9 in which the assembly of the sleeves 6 and 7 and spring 8 is mounted.

The assembly of the inner sleeve 6 and the outer sleeve 7, together with the spring 8, provides the means for securing the tubular portion 4 of attachment tool 3 within the coupling as well as providing the swivel means by which the attachment 3 may be rotated about the longitudinal axis of the assembly. The resilient or elastic sleeve 9, which is preferably rubber, provides an airtight seal between the attachment 3 and the extension hose or tube 2, and also provides the means by which the assembly of the sleeves 6 and 7 and the spring 8 are secured to the extension hose.

As shown, the sleeves 6 and 7 are preferably cylindrical and may be fabricated from sheet metal, preferably sheet steel. The inner sleeve 6 is provided with an outturned flange 10 near one end thereof, and is provided with interengaging means, such as at least one, and preferably four notches or keyways 11, disposed in the other end edge of said sleeve remote from the outturned flange 10. The notches or keyways 11 are preferably equally spaced about the end of the sleeve 10. In addition, the sleeve 6 is tapered slightly with its larger diameter at the notched end thereof, on the same taper as the tapered end 4 of tool 3.

The outer sleeve 7 has a diameter sufficiently greater than that of the outer surface of the inner sleeve 6 to provide a space therebetween in which the spring 8 may be mounted. The outer sleeve 7 includes an inturned flange or shoulder 12 near the inner sleeve outturned flange 10. The other end of the outer sleeve 7 is provided with complementary interengaging means, such as at least one and preferably four keys or radially inturned ears 13, which are inturned a sufficient distance and equally spaced to engage the keyways 11 at such time as it is desirable to prevent rotation of sleeve 6, as when withdrawing the attachment 3.

Under normal operations with the attachment 3 inserted in the coupling and its tapered surface in frictional engagement with the tapered surface of the inner sleeve 6, as shown in Fig. 2, the outturned flange 10 is in abutment with the inturned flange 12 so that the inner sleeve 6 may be rotated with respect to the outer sleeve 7. The helical spring 8 which is retained between the inturned keys 13 at one end and the outturned flange 10 at the other end, maintains the flanges 10 and 12 in abutment.

Accordingly, with the attachment 3 so disposed within the coupling 1 as shown in Fig. 2, the frictionally engaged tapered surfaces of members 4 and 6 hold the tool assembled to the swivel coupling. Such arrangement avoids any change in normal tool construction which ordinarily includes a tapered tubular end portion 4 for engagement with cleaner wand attachments.

When it is desired to remove the attachment 3 from the coupling 1, the attachment is pulled outward against the spring 8 and, at the same time, rotated until the keyways 11 engage keys 13, as shown in Fig. 3. Further rotational force is applied to the tool 3 to overcome the friction between the inner sleeve 6 and the tubular portion 4 of the attachment, to effect their separation. As soon as separation is effected, the inner sleeve 6 is returned by the spring 8 to the free rotational position, as shown in Fig. 2, the interengaging means, namely the keys 13 and keyways 11, disengaging at this time.

The elastic sleeve 9 is provided with a sealing closure portion 14 integral with said sleeve. The portion 14 extends beyond the ends of the assembled sleeves 6 and 7 and is preferably thicker than that portion of the sleeve 9 surrounding said assembly. Moreover, the portion 14 is flange-like in cross-section terminating internally in a rounded edge forming an opening 15 whose internal circumference is normally less than the outer circumference of the tubular portion 4 of the attachment 3 whereby the portion 4, when inserted within the coupling, is held by sealing portion 14 in airtight assembly therewith. At the same time the tubular portion 4 may be rotated because of the resilience of the rubber, but the frictional engagement of sealing portion 14 on tool portion 4 normally holds the tool in any adjusted rotated position.

The sleeve 9 extends by a tubular portion 9a from the sealing closure portion 14 to a thicker portion 9b forming a shoulder 9c engaged with the shoulder 12 of sleeve 7 and a shoulder 9d engaged with the end portion 2a of hose 2 received within the end portion 9e of sleeve 9, remote from the sealing closure portion 14.

During fabrication the sleeve 9 is molded on the end 2a of the hose 2 which end is seated within the sleeve portion 9e, so that the hose and sleeve are inseparable.

The thickened sleeve portion 9b also includes a radially inwardly projecting internal flange 16 having an axially extending flange portion 16a projecting toward the sealing portion 14 and terminating in a preferably tapered feathered edge 16b. Flange portion 16a is spaced internally from the thickened sleeve portion 9b to form an annular channel 17 opening toward the sealing end of sleeve 9, and channel 17 receives the inner end of outer sleeve 7.

Thus, when the sheet metal sleeve 7 is assembled within the elastic sleeve 9, the portions 12 and 13 of sleeve 7 are gripped endwise between the portions 14 and 9c of sleeve 9 to hold the sleeve 7 tightly assembled in sleeve 9 without requiring any cemented joint therebetween as heretofore has been used in securing a metal coupling member to a suction cleaner hose attachment.

In assembling the coupling parts, the spring 8 and inner sleeve 6 are telescoped within outer sleeve 7 and the ears 13 are bent over to the position shown in Figs. 2, 3 and 4 to retain the coupling sleeves 6 and 7 assembled. This assembly is then inserted within the resilient or elastic rubber sleeve 9, as shown.

In the normal position of the coupling parts, shown in Fig. 2, with sleeve 6 pressed axially by spring 8 to engage flange 10 against shoulder 12, the end edge 6a of inner sleeve 6 is also pressed into engagement with the feathered edge 16b of flange 16a of sleeve 9 to form an airtight seal therebetween. Thus, the improved coupling has an airtight seal not only between sealing portion 14 and tool 3, but also between the inner sleeve 6 and rubber sleeve 9 at 6a and 16b.

In the manufacture of hose attachments for suction cleaners, the desired lengths of hose are cut from longer pieces of usual fabric-covered, wire-reinforced, rubber hose and the cut ends thereof may sometimes present frayed fabric end edges. These frayed fabric end edges, if present, are enclosed by the annular shoulder 9d so that viewing the interior of the hose and coupling from the open end of the coupling, that is from the right of Fig. 2, a substantially smooth passage is present through the inner sleeve 6, the flange portions 16 and 16a and the interior of hose 2, for the passage of suction air currents therethrough.

As shown in Figs. 1 and 4, the external surface of the resilient sleeve 9 is preferably provided with a plurality of equally spaced longitudinal ribs 18 and with grooves 19 disposed therebetween. This combination of the ribs 18 and the grooves 19 presents a pleasing appearance as well as providing an efficient hand grip for the coupling 1 for manipulating the attachment 3.

Hence, the swivel coupling 1 provides an inexpensive swiveling means for an extension hose without the usual retaining pins or springs, and includes a rubber end which is effective as a bumper so that the hose can be used as a cleaning nozzle without additional tools. Moreover, the coupling is provided with tapered fittings to receive attachments or tools or wands having usual tapered tubular ends which may be rotatably mounted within the coupling in an airtight manner. Furthermore, the coupling is not subject to the unwieldiness of prior swivel couplings which are separately attached to the end of the hose, nor is the coupling subject to uncomfortable looseness which invariably results from the use of retaining pins and springs between the hose and attachments in other swivel couplings.

Also, the improved swivel coupling provides for complete 360° swivel movement between the tool and a hose to which the tool is attached and at the same time includes keying or engageable means which may be engaged to prevent rotation of the coupling parts when it is desired to detach the tool by twisting to release the tapered friction fit between the tool and one of the coupling parts. Finally, the coupling in addition to providing an airtight seal between the coupling and tool, provides a measure of resistance to free swiveling so that the tool holds in any adjutsed swivelled position giving excellent operator control of the tool or attachment in use.

In the foregoing description certain terms have been used for brevity, clearness and understanding but no unnecessary limitations are to be implied therefrom beyond the requirements of the prior art, because such words are used for descriptive purposes herein and are intended to be broadly construed.

Moreover, the embodiments of the improved constructions illustrated and described herein are by way of example, and the scope of the present invention or discovery is not limited to the exact details of construction set forth.

Having now described the invention or discovery, the construction, the operation, and use of a preferred embodiment thereof, and the advantageous, new and useful results obtained thereby; the new and useful constructions, and reasonable mechanical equivalents thereof obvious to those skilled in the art, are set forth in the appended claims.

I claim:

1. A detachable swivel coupling for separable suction tubes having tapered end portions telescoped one within the other, one of said tubes including an outer sleeve having a first annular flange extending radially inwardly an inner sleeve rotatably mounted within the outer sleeve and having a second annular flange extending radially outwardly and normally abutting the first flange, the inner sleeve having a tapered internal surface receptive of the tapered end portion of the other of said tubes, the inner and outer sleeves having complementary interengaging means, the longitudinal spacing between the first flange and one member of the interengaging means on the outer sleeve being greater than that between the second flange and the other member of the interengaging means on the inner sleeve, the inner sleeve being movable longitudinally between the flange-abutting position and interengaging means position, and spring means between the sleeves normally maintaining the flanges in abutment.

2. A detachable swivel coupling for separable suction tubes having tapered end portions telescoped one within the other, one of said tubes including an outer sleeve having a first annular flange extending radially inwardly an inner sleeve rotatably mounted within the outer sleeve and having a second annular flange extending radially outwardly and normally abutting the first flange, the inner sleeve having a tapered internal surface receptive of the tapered end portion of the other of said tubes, the inner sleeve having one member of a key-keyway joint, the outer sleeve having another member of a key-keyway joint, the longitudinal spacing between the first flange and the key on the outer sleeve being greater than that between the second flange and the key notch on the inner sleeve, the inner sleeve being movable longitudinally between the flange-abutting position and the key-keyway joint position, and spring means between the sleeves normally maintaining the flanges in abutment.

3. A detachable swivel coupling for separable suction tubes having tapered end portions telescoped one within the other, one of said tubes including an outer sleeve having a first annular flange extending radially inwardly an inner sleeve rotatably mounted within the outer sleeve and having a second annular flange extending radially outwardly and normally abutting the first flange, the inner sleeve having a tapered internal surface receptive of the tapered end portion of the other of said tubes, the inner sleeve having at least one keyway at the end remote from the second flange, the outer sleeve having at least one inturned key at the end remote from the first flange, the longitudinal spacing between the first flange and the key on the outer sleeve being greater than that between the second flange and the key notch on the inner sleeve, the inner sleeve being movable longitudinally between the flange-abutting position and the key-keyway joint position, and a helical spring between the sleeves normally maintaining the flanges in abutment.

4. A sealed swivel coupling for separable suction tubes having tapered end portions telescoped one within the other, one of said tubes including an outer sleeve having a first annular flange extending radially inwardly an inner sleeve rotatably mounted within the outer sleeve and having a second annular flange extending radially outwardly and normally abutting the first flange, the longitudinal spacing between the first flange and one member of the interengaging means on the outer sleeve being greater than that between the second flange and the other member of the interengaging means on the inner sleeve, the inner sleeve having a tapered internal surface receptive of the tapered end portion of the other of said tubes, the inner and outer sleeves having complementary interengaging means, the inner sleeve being movable longitudinally between the flange-abutting position and interengaging means position, spring means between the sleeves normally maintaining the flanges in abutment, a resilient sleeve on the outer surface of the outer sleeve extending beyond the end of the said outer sleeve and terminating in a sealing closure portion having an internal circumference normally less than that of the inner sleeve.

5. A sealed swivel coupling for separable suction tubes having tapered end portions telescoped one within the other, the outer tube including an outer sleeve having a first annular flange extending radially inwardly at one end and having at least one key extending radially inwardly at the other end thereof, an inner sleeve movably mounted within the outer sleeve and having a second annular flange extending radially outwardly and normally abutting the first flange on the side facing the key, the inner sleeve being movable longitudinally between the flange-abutting position and the key-keyway joint position, the inner sleeve also having at least one key notch engageable with said key at the end remote from the out-turned flange normally spaced from said key, the inner sleeve having a tapered internal surface receptive of the tapered end portion of the inner tube, the longitudinal spacing between the first flange and the key on the outer sleeve being greater than that between the second flange and the key notch on the inner sleeve, a helical spring between the second flange and the key normally holding the first and second flanges in abutment, a resilient sleeve on the outer surface of the outer sleeve and extending beyond the keyed end of said sleeve and terminating in a sealing closure portion having a greater thickness than the portion of the resilient sleeve mounted on the outer sleeve, and said sealing portion having an internal circumference normally less than the inner diameter of the inner sleeve.

6. The construction defined in claim 5 in which the end of the resilient sleeve remote from the sealing closure portion extends beyond the flanged ends of the inner and outer sleeves and overlies a portion of said outer tube.

7. The construction defined in claim 5 in which the resilient sleeve is composed of rubber and is provided with an internal flange having an annular groove on the side of the flange facing the flanged ends of the inner and outer sleeves, the ends of said sleeves being mounted within said groove.

References Cited in the file of this patent

UNITED STATES PATENTS

| | | |
|---|---|---|
| 868,311 | White | Oct. 15, 1907 |
| 1,117,856 | Kent | Nov. 17, 1914 |
| 1,311,834 | Mueller | July 29, 1919 |
| 2,417,955 | St. Clair et al. | Mar. 25, 1947 |
| 2,667,371 | Holte | Jan. 26, 1954 |
| 2,582,446 | Martinet | Jan. 15, 1952 |